Patented Feb. 9, 1932

1,844,408

UNITED STATES PATENT OFFICE

FRITZ NICOLAI, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF PHOSPHORIC ACID ESTERS OF ALIPHATIC ALCOHOLS

No Drawing. Application filed October 29, 1929, Serial No. 403,367, and in Germany November 20, 1928.

The present invention relates to the production of mixed phosphoric acid esters.

Elsewhere I have described the production of neutral phosphoric acid esters of primary aliphatic alcohols by which phosphorus oxychloride is caused to react with the alcohol in such a manner that the hydrochloric acid formed by the reaction is removed from the reacting liquid during the reaction. This can be effected by working at elevated temperatures, preferably at about the boiling point of the mixture, or by carrying on the reaction under reduced pressure, the combination of both conditions being particularly advantageous.

This process may serve for the production of simple, and also of mixed, neutral esters. For example, if butyl alcohol employed in an esterification in the aforesaid manner be partly replaced by ethyl alcohol or isoamyl alcohol, the mixed ester corresponding to the ratio of the quantities employed is obtained; it frequently happens, however, that this manner of working does not lead to uniform mixed esters, because by reason of the greater reactivity of one or other of the alcohols which may be employed in the initial mixture a simple ester is also formed in which all the alcoholic radicles present are the same radicles.

I have now found that uniform neutral mixed esters are obtained in good yields by first bringing 1 molecular proportion of phosphorus oxychloride into reaction with from 1 to 2 i. e. with 1 or 2 molecular proportions of a primary alcohol while removing the hydrochloric acid formed in the reaction from the reacting liquid during the reaction, and by then causing the product thus obtained to react with a second alcohol.

For example, 1 molecular proportion of phosphorous oxy-chloride may be first mixed with 1 or 2 molecular proportions of a primary alcohol, preferably in the cold, the mixture being then heated for a short time under reduced pressure, the temperature being preferably chosen between 30° and 60° C. according to the alcohol employed; in this manner, according to the quantity of primary alcohol employed, the monoalkyl or dialkyl phosphoric acid chloride is formed with the almost complete evolution of the hydrochloric acid which is split off. The second alcohol is then added, preferably in excess to the quantity required for complete esterification and the formation of the neutral ester is completed in the same manner. By the process in accordance with the present invention neutral mixed phosphoric esters of primary aliphatic alcohols and phenols may also be prepared, for example by first acting with 1 or 2 molecular proportions of a phenol on a molecular proportion of phosphorus oxychloride, and then further treating the reaction product with an aliphatic alcohol, or by proceeding in the reverse order.

Suitable diluents may be added to the reaction mixture, preferably such as lower the boiling point of the mixture, such as chloroform or benzene. Moreover, metallic catalysts, such as copper powder, metal chlorides, and the like may be added to the reaction liquid, in order to facilitate the splitting off of the hydrochloric acid. The degree of reduced pressure employed may vary within wide limits, but should be as low as attainable.

The following examples will further illustrate the nature of this invention but the invention is not restricted to these examples. The parts are by weight.

Example 1

176 parts of isoamyl alcohol are slowly mixed during the course of an hour with 153 parts of phosphorus oxychloride while cooling; the temperature during this stage must not exceed 15° C. The reaction mixture is then heated, with the interposition of a suitable receiver, at a reduced pressure of about 50 millimeters of mercury and at a temperature of 50° C. for about 30 minutes. The whole is cooled again to 20° C, 250 parts of butyl alcohol are added and the whole is heated as before for 30 minutes at 40° C. For the purpose of recovering the neutral mixed ester formed, the reaction product is washed with water, to which a small quantity of caustic alkali or of an alkali metal carbonate may be added, until it is neutral.

Normal butyl diisoamyl phosphate, having a boiling point of from 121° to 122° C. at 1.5 millimeters mercury pressure, is then obtained in good yields by fractional distillation.

Example 2

A mixture of 95 parts of ethyl alcohol and 153 parts of phosphorus oxychloride which mixture has been prepared at about 0° C. is heated for about 30 minutes at a temperature of 30° C. as described in Example 1, and then 200 parts of isoamyl alcohol are added to the mixture. The esterification is brought to completion by heating for about an hour at 50° C. with the employment of reduced pressure. Di-ethyl isoamyl phosphate, having a boiling point of from 84° to 85° C. at 2 millimeters mercury pressure is then obtained by fractional distillation.

Example 3

148 parts of n-butyl alcohol are mixed with 154 parts of phosphorus oxychloride at a temperature below zero c. and the mixture is then heated for about 30 minutes to 50° C. in the manner described in Example 1. 300 parts of phenol are then added and the reaction mixture is then heated for further two hours at 70° C. in vacuo. The reaction mixture is then mixed with benzene and separated and the benzolic solution is washed with water and caustic soda solution for the removal of remainders of hydrochloric acid and of phenol. The residue is then distilled in vacuo, di-butyl phenyl phosphate with a boiling point of 161° to 162° C. at about 4 millimeters mercury pressure being obtained.

What I claim is:—

1. The process of producing neutral mixed phosphoric esters of primary aliphatic alcohols which comprises acting with 1 molecular proportion of phosphorus oxychloride upon from 1 to 2 molecular proportions of a primary aliphatic alcohol while heating and continuously removing the hydrochloric acid formed during the process, and then proceeding in the same manner after adding a quantity of another alcohol at least sufficient for complete esterification.

2. The process of producing neutral mixed phosphoric esters of primary aliphatic alcohols which comprises acting with 1 molecular proportion of phosphorus oxychloride upon from 1 to 2 molecular proportions of a primary aliphatic alcohol while heating the mixture to about its boiling point and continuously removing the hydrochloric acid formed during the process, and then proceeding in the same manner after adding a quantity of another alcohol at least sufficient for complete esterification.

3. The process of producing neutral mixed phosphoric esters of primary aliphatic alcohols which comprises acting with 1 molecular proportion of phosphorus oxychloride upon from 1 to 2 molecular proportions of a primary aliphatic alcohol while reducing the pressure within the reaction vessel and heating the mixture to about its boiling point, and then proceeding in the same manner after adding a quantity of another alcohol at least sufficient for complete esterification.

4. The process of producing neutral mixed phosphoric esters of primary aliphatic alcohols which comprises acting with 1 molecular proportion of phosphorus oxychloride upon from 1 to 2 molecular proportions of a primary aliphatic alcohol in the presence of a metallic catalyst while heating and continuously removing the hydrochloric acid formed during the process, and then proceeding in the same manner after adding a quantity of another alcohol at least sufficient for complete esterification.

5. The process of producing neutral mixed phosphoric esters of primary aliphatic alcohols which comprises acting with 1 molecular proportion of phosphorus oxychloride upon from 1 to 2 molecular proportions of a primary butyl alcohol at about the boiling point of the mixture while continuously removing the hydrochloric acid formed during the process, and then proceeding in the same manner after adding a quantity of another alcohol at least sufficient for complete esterification.

6. The process of producing neutral mixed phosphoric esters of primary aliphatic alcohols which comprises acting with 1 molecular proportion of phosphorus oxychloride upon from 1 to 2 molecular proportions of butyl alcohol at about 50° C. and reducing the pressure within the reaction vessel to below 60 millimeters (mercury gauge) and then proceeding in the same manner after adding a quantity of another alcohol at least sufficient for complete esterification.

7. As new articles of manufacture neutral mixed phosphoric esters in which one aliphatic alcoholic radicle contains at least 4 carbon atoms.

8. As new articles of manufacture neutral mixed phosphoric esters containing a radicle of a primary aliphatic alcohol and at least one radicle of an aliphatic alcohol containing at least 4 carbon atoms in its molecule.

9. As new articles of manufacture neutral mixed phosphoric esters containing a radicle of a primary aliphatic alcohol containing at least 4 carbon atoms and at least one radicle of a phenol.

10. As new articles of manufacture neutral mixed phosphoric esters containing a radicle of a primary aliphatic alcohol, a radicle of an alcohol containing at least 4 carbon atoms in its molecule and a radicle of a phenol.

In testimony whereof I have hereunto set my hand.

FRITZ NICOLAI.